United States Patent
Isshiki (10) Patent No.: US 9,910,478 B2
(45) Date of Patent: Mar. 6, 2018

(54) COLLATION SYSTEM, NODE, COLLATION METHOD, AND COMPUTER READABLE MEDIUM

(71) Applicant: NEC Corporation, Minato-ku, Tokyo (JP)

(72) Inventor: Toshiyuki Isshiki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/787,848

(22) PCT Filed: May 14, 2014

(86) PCT No.: PCT/JP2014/062820
§ 371 (c)(1),
(2) Date: Oct. 29, 2015

(87) PCT Pub. No.: WO2014/185462
PCT Pub. Date: Nov. 20, 2014

(65) Prior Publication Data
US 2016/0080333 A1    Mar. 17, 2016

(30) Foreign Application Priority Data
May 17, 2013    (JP) .................... 2013-105356

(51) Int. Cl.
*H04L 29/06*    (2006.01)
*G06F 1/32*    (2006.01)
(Continued)

(52) U.S. Cl.
CPC .............. *G06F 1/3212* (2013.01); *G06F 3/00* (2013.01); *G06F 13/40* (2013.01); *H01L 23/5382* (2013.01); *H04L 9/3093* (2013.01); *H04L 63/0442* (2013.01); *H01L 2924/0002* (2013.01); *H04L 2209/24* (2013.01);
(Continued)

(58) Field of Classification Search
USPC ......................................... 713/168, 169, 171
See application file for complete search history.

(56) References Cited

U.S. PATENT DOCUMENTS

2004/0230800 A1* 11/2004 Futa .................... G06F 21/32
713/169
2007/0150404 A1* 6/2007 Golle .................... G06Q 40/04
705/37
(Continued)

FOREIGN PATENT DOCUMENTS

JP    2006-158851 A    6/2006
JP    2008-521025 A    6/2008
(Continued)

OTHER PUBLICATIONS

International Search Report for PCT Application No. PCT/JP2014/062820, dated Aug. 12, 2014.
(Continued)

*Primary Examiner* — Jason Lee (57) ABSTRACT

A collation system includes a first node, a second node and a third node. The first node includes: an encryption unit; a distance calculation unit t; and a collation data generation unit. The second node includes: a key generation unit; and a collation unit. The third node includes: a storage unit; and a collation information generation unit.

8 Claims, 4 Drawing Sheets

(51) Int. Cl.
*G06F 3/00* (2006.01)
*H01L 23/538* (2006.01)
*H04L 9/30* (2006.01)
*G06F 13/40* (2006.01)
*H05K 1/02* (2006.01)
*H05K 1/14* (2006.01)

(52) U.S. Cl.
CPC ............. *H05K 1/029* (2013.01); *H05K 1/142* (2013.01); *H05K 2201/10037* (2013.01); *H05K 2201/10212* (2013.01); *Y02B 60/1292* (2013.01)

(56) References Cited

U.S. PATENT DOCUMENTS

| | | | |
|---|---|---|---|
| 2009/0310779 A1 | 12/2009 | Lam et al. | |
| 2010/0106964 A1* | 4/2010 | Hirata | H04L 63/0861 713/155 |
| 2010/0217986 A1* | 8/2010 | Schneider | H04L 9/3242 713/171 |
| 2011/0126295 A1* | 5/2011 | Resch | G06F 21/64 726/27 |
| 2012/0254612 A1* | 10/2012 | Rane | G06N 7/005 713/168 |
| 2013/0318351 A1* | 11/2013 | Hirano | H04L 9/3073 713/168 |

FOREIGN PATENT DOCUMENTS

| | | |
|---|---|---|
| JP | 2012-169908 A | 9/2012 |
| WO | 2011/052056 A1 | 5/2011 |
| WO | 2012/056582 A1 | 5/2012 |

OTHER PUBLICATIONS

English translation of Written opinion for PCT Application No. PCT/JP2014/062820.

Siamak F. Shahandashti, Reihaneh Safavi-Naini, Philip Ogunbona, "Private Fingerprint Matching", 2012.

* cited by examiner

COLLATION SYSTEM, NODE, COLLATION METHOD, AND COMPUTER READABLE MEDIUM

TECHNICAL FIELD

This application is a National Stage Entry of PCT/JP2014/062820 filed on May 14, 2014, which claims priority from Japanese Patent Application 2013-102955 filed on May 15, 2013, the contents of all of which are incorporated herein by reference, in their entirety.

The present invention relates to a collation system, a node, a collation method, and a computer readable medium, and more particularly, to a collation system that permits ambiguity of data to be collated, a node, a collation system, and a computer readable medium.

BACKGROUND ART

In recent years, with the spread of a cloud computing, a service, which is provided using data of a user accumulated in computer resources connected to a network, is rapidly prevailing. In such a service, an opportunity of treating sensitive data of a user is increasing. Consequently, it is important to guarantee safe management of user's data.

Under such a situation, research and development have been actively conducted for a technology of managing data an encrypted state in an open network environment and executing retrieval, statistical processing and the like without decrypting the data.

Furthermore, in recent years, since crimes having exploited vulnerability of personal authentication using a password and a magnetic card frequently occur, a biometric authentication technology with higher safety based on biometric features such as a fingerprint and a vein has been spotlighted.

In biometric authentication, in order to verify authentication information, it is necessary to keep templates regarding biometric information in a database. Since biometric information such as a fingerprint and a vein is basically unchangeable throughout the life and great damage occurs when the information is leaked, high confidentiality is required.

Therefore, a template protection type biometric authentication technology, in which template information is authenticated while keeping the template information secret such that "impersonation" can be prevented even though templates are leaked, has become important.

For example, Patent Literature 1 discloses a scheme in which fingerprint data is expressed as points on a polynomial, random points are added to the points, and biometric authentication is performed employing data keeping the secrecy of the fingerprint data as templates.

Furthermore, Non-Patent Literature 1 discloses a scheme in which biometric information of a client requesting authentication is protected using public key encryption having homomorphism.

Moreover, Patent Literature 2 discloses a system in which a verification device encrypts a feature vector for registration using a public key and random numbers, registers the encrypted feature vector for registration in an authentication device. During authentication, the verification device encrypts a feature vector for authentication using the public key and the random numbers. Subsequently, while the two encrypted feature vectors are in a state of encryption, the verification device generates encryption similarity information from which the degree of similarity between the two feature vectors can be derived by means of decryption processing using a secret key. Moreover, a decryption device decrypts the encryption similarity information and derives the degree of similarity of a plaintext, and a source is authenticated if the degree of similarity is equal to or over a threshold value.

CITATION LIST

Patent Literature

Patent Literature 1: Japanese Unexamined Patent Application Publication No. 2006-158851
Patent Literature 2: International Publication No. 2011/052056

Non-Patent Literature

Non-Patent Literature 1: Siamak F. Shahandashti, Reihaneh Safavi-Naini, and Philip Ogunbona, "Private Fingerprint Matching", ACISP 2012.

SUMMARY OF INVENTION

Technical Problem

It is assumed that the entire disclosure contents of the aforementioned Patent Literature and Non-Patent Literature are incorporated herein by reference. The following analysis has been made by the present inventor.

The scheme of Patent Literature 1 has been known that biometric information may not be protected with sufficient strength when biometric authentication has been repeated any number of times.

On the other hand, Non-Patent Literature 1 proposes the scheme in which biometric information of a client requesting authentication is protected using public key encryption having homomorphism.

In a biometric authentication scheme not protecting biometric information, a feature point called a minutia is extracted from the biometric information (for example, a fingerprint and the like), and the minutia is registered in a server as a template for authentication. In general, the minutia includes three components of a type, a coordinate (x, y), and an angle. The type indicates a type of a feature point, and for example, is an endpoint, a branch point and the like. The coordinate indicates a coordinate of the feature point, and the angle indicates a slope of a tangent at the feature point.

The server confirms that the minutia extracted from the biometric information of the client during authentication and the minutia registered as the template for authentication coincide with each other. When satisfying three conditions of (1) the types of feature points coincide with each other, (2) a distance between the feature points is within a threshold value, and (3) a difference of slopes of tangents at the feature points is within the threshold value, it is regarded that the minutia have coincided with each other.

In detail, in the case in which the minutia extracted during authentication is defined as (type 1, (x1,y1), $\theta1$) and the registered minutia is defined as (type 2, (x2,y2), $\theta2$), when satisfying three conditions of (1) type 1=type 2, (2) $0 \leq ((x1-x2)^2+(y1-y2)^2) \leq \delta d$, and (3) $0 \leq (\theta1-\theta2)^2) \leq \delta t$, it is regarded that the two minutia have coincided with each other.

Herein, $\delta d$ and $\delta t$ are parameters decided by a system. Furthermore, a distance evaluated in (2) is called a two-dimensional Euclid distance or a L2 norm. Similarly, a distance evaluated in (3) is called a one-dimensional Euclid distance. Hereinafter, these are collectively called a Euclid distance and a Euclid distance of D and D' is expressed by d (D, D').

Non-Patent Literature 1 discloses a biometric authentication scheme capable of concealing the biometric information of the client requesting authentication. In detail, an encryption protocol called Aided Computation and Set Intersection is used. By this encryption protocol, it is possible to confirm whether the minutia (type 2, (x2,y2), θ2) registered in the server and the minutia (type 1, (x1,y1), θ1) extracted during authentication coincide with each other without revealing the minutia (type 1, (x1,y1), θ1) to the server.

Hereinafter, data registered in a server in advance from a client will be referred to as "authentication data". Furthermore, data extracted during authentication and to be collated with the authentication data will be referred to as "authentication target data". In the aforementioned example, the minutia (type 2, (x2,y2), θ2) corresponds to the authentication data and the minutia (type 1, (x1,y1), θ1) corresponds to the authentication target data.

As preparation to describe these encryption protocols, public key encryption will be described. The public key encryption includes three algorithms of key generation, encryption, and decryption. The key generation is a probabilistic algorithm that receives a security parameter as input and outputs a public key pk and a secret key sk. The Encryption is a probabilistic algorithm that receives the public key pk and a message M as input and outputs a ciphertext C. The decryption is a deterministic algorithm that receives the secret key sk and the ciphertext C as input and outputs a decryption result M.

Hereinafter, the key generation, the encryption, and the decryption algorithms are written as follows.

Key generation: KeyGen $(1^k)$→(pk,sk)
Encryption: Enc(pk,M)→C
Decryption: Dec(sk,C)→M The case in which the public key encryption scheme has homomorphism indicates the case in which the following Equation is satisfied with respect to certain operations (*) and (+).

Enc(pk,$M1$(+)$M2$)=Enc(pk,$M1$)(*)Enc(pk,$M2$)

For example, Paillier encryption has been known as public key encryption having homomorphism in which (*) and (+) have been respectively employed as multiplication and addition. Next, the Paillier encryption will be described.

Key generation: receive security parameter $1^k$.
Randomly select prime numbers p and q of k bits and set n to be equal to pq.
Next, g is assumed to be 1+n mod $n^2$.
Output public key pk=(n,g) and secret key sk=(p,q).
Encryption: receive pk=(n,g) and message m as input.
Randomly select r from $Z^*\_\{n^2\}$.
Calculate C=(1+mn)·$r^n$ mod $n^2$.
Output ciphertext C.
Decryption: receive sk=(p,q) and ciphertext C as input.
Calculate λ=(p−1)(q−1).
Calculate m=($c^{\{\lambda\}}$ mod $n^2$−1)/($g^{\{\lambda\}}$ mod $n^2$−1) mod n.
Output plaintext m.

When C1=Enc(pk,m1)=(1+m1 n)·$r1^n$ mod $n^2$ and C2=Enc(pk,m2)=(1+m2n)·$r2^n$ mod $n^2$, since C1×C2=(1+(m1+m2)n+m1·m2·$n^2$)·$(r1r2)^n$ mod $n^2$=(1+(m1+m2)n)·$(r1r2)^n$ mod $n^2$=Enc(pk,m1+m2), the Paillier encryption has homomorphism. As described above, the public key encryption capable of performing addition of a plaintext in an encrypted state is called additive homomorphism public key encryption.

Set Intersection is an encryption protocol performed between Alice and Bob which are entities of two persons. It is assumed that the Alice has data a and the Bob has an aggregation B of data. At this time, the Set Intersection is a protocol for confirming whether the data a is included in the aggregation B in a state in which the data a of the Alice has been kept secret to the Bob.

For the purpose of simplification, the Set Intersection will be described using the aggregation B={b1,b2,b3}. Furthermore, it is assumed that the Bob opens the public key pk of the additive homomorphism public key encryption and holds the corresponding secret key sk.

1. The Bob generates a polynomial F(x) having a value of 0 when x=b1,b2,b3 and values other than 0 in other cases. For example, it is sufficient if F(x)=(x−b1)(x−b2)(x−b3). Such a polynomial can be easily generated using Lagrange interpolation. Herein, it is assumed that coefficients of F(x) are α[0], α[1], . . . , α[n]. That is, F(x)=α[n]$x^n$+α[n−1]$x^{\{n-1\}}$+ . . . +α[1]x+α[0].

2. The Bob respectively encrypts α[0], α[1], . . . , α[n] by using the public key pk. Furthermore, the Bob sends a ciphertext C[0], C[1], . . . , C[n] to the Alice.

3. The Alice calculates $a^{\{n\}}$, $a^{\{n-1\}}$, . . . , $a^{\{0\}}$. Moreover, the Alice calculates C[n]$^{\{a^{\{n\}}\}}$, C[n−1]$^{\{a^{\{n-1\}}\}}$, . . . , C[0]$^{\{a^{\{0\}}\}}$.

4. The Alice calculates C=C[n]$^{\{a^{\{n\}}\}}$·C[n−1]$^{\{a^{\{n-1\}}\}}$, . . . , C[0]$^{\{a^{\{0\}}\}}$. By homomorphism, C=Enc(pk,F(a)). Furthermore, the Alice randomly selects r and sets C' as $C^{\{r\}}$. Moreover, the Alice sends C' to the Bob.

5. The Bob decrypts the received C'. When the decryption result is 0, the Bob determines that the Alice has data included in the aggregation B, and when the decryption result is not 0, the Bob determines that the Alice does not have the data included in the aggregation B.

For the purpose of simplification, a protocol of the Set Intersection by the Alice having input a and the Bob having the aggregation B and the secret key sk is written as Set Intersection [Alice (a), Bob (B,sk)](pk). Herein, pk indicates the public key pk which is common input to the Alice and the Bob.

Next, Aided Computation will be described. The Aided Computation is also an encryption protocol performed between the Alice and the Bob which are entities of two persons. It is assumed that the Alice has a ciphertext Enc(pk,a) of the data a and the Bob has an aggregation B of data and the secret key sk corresponding to the public key pk. Encryption of the Bob is the additive homomorphism public key encryption. At this time, the Aided Computation is a protocol for confirming whether the data a is included in the aggregation B in a state in which the data a of the Alice has been kept secret to the Bob. The Aided Computation is different from the Set Intersection and the Alice does not know the plaintext of the data a.

For the purpose of simplification, the Aided Computation will be described using B={b1,b2,b3}. Furthermore, it is assumed that the polynomial F(x) having a value of 0 when x=b1,b2,b3 and values other than 0 in other cases has been opened. That is, it is assumed that F(x)=α[n]$x^n$+α[n−1]$x^{\{n-1\}}$+ . . . +α[1]x+α[0] and α[0] to α[n] have been opened.

1. The Alice randomly selects r, calculates Enc(pk,ra)={Enc(pk,a)}$^{\{r\}}$, and sends Enc(pk,ra) to the Bob.

2. The Bob decrypts Enc(pk,ra) to obtain ra.

3. The Bob calculates (ra)$^{\{\alpha[1]\}}$, (ra)$^{\{\alpha[2]\}}$, . . . , (ra)$^{\{\alpha[n]\}}$ and respectively encrypts them by using the public key pk.

That is, the Bob performs $C[i]=Enc(pk,(ra)^{\{\alpha[i]\}}$ with respect to i=1 to n and sends C[1] to C[n] to the Alice.

4. The Alice calculates $C'[i]=(C[i])^{\{1/(r^{\{i\}})\}}$ with respect to i=1 to n.

5. The Alice calculates C=C'[1]·C'[2] . . . C'[n]·Enc(pk, α[0]) and sends it to the Bob. By homomorphism, C=Enc (pk,F(a)).

6. The Bob decrypts C. When the decryption result is 0, the Bob determines that the Alice has a ciphertext of data included in the aggregation B, and when the decryption result is not 0, the Bob determines that the Alice does not have the ciphertext of the data included in the aggregation B.

For the purpose of simplification, a protocol of the Aided Computation for the function F(x) by the Alice having input Enc(pk,a) and the Bob having the aggregation B and the secret key sk is written as Aided Computation [Alice Enc (pk,a), Bob (B,sk)](pk,F(x)). Herein, pk indicates the public key pk which is common input to the Alice and the Bob.

In Non-Patent Literature 1, the Set Intersection and the Aided Computation are used in order to confirm that the minutia (type 1, (x1,y1), θ1) (authentication target data) of the client and the template (type 2, (x2,y2), θ2) (authentication data) for authentication held in the server coincide with each other. In detail, the following processing is performed.

(1) Coincidence of type: perform Set Intersection [client (type 1), server (type2,sk)](pk).

(2) Coincidence of distance: firstly calculate Euclid distance between (x1,y1) and (x2,y2) in an encrypted state.

(i) The server generates F(x) by employing B={0, 1, . . . , δd}.

(ii) The server respectively calculates $Enc(pk,x2^2)$, Enc (pk,x2), $Enc(pk,y2^2)$, and Enc(pk,y2), and sends them to the client.

(iii) The client calculates $Enc(pk,x1^2)$ and $Enc(pk,y1^2)$.

(iv) The client calculates $Enc(pk,x1^2)\cdot\{Enc(pk,x2)\}^{\{-2x1\}}\cdot Enc(pk,x2^2)\cdot Enc(pk,y1^2)\cdot\{Enc(pk,y2)\}^{\{-2y1\}}\cdot Enc(pk,y2^2)=Enc(pk,(x1-x2)^2+(y1-y2)^2)$.

(v) Perform Aided Computation[client (Enc(pk, $(x1-x2)^2+(y1-y2)^2$)),server ({0, 1, . . . , δd},sk)](pk,F(x)).

(3) Coincidence of angle: similarly to the coincidence of distance, calculate $Enc(pk,(\theta1-\theta2)^2)$, and perform Aided Computation[client $(Enc(pk,(\theta1-\theta2)^2))$,server (B',sk)](pk,G (x)) for G(x) corresponding to B'={0, 1, . . . , δt}.

According to the technology disclosed in Non-Patent Literature 1, the authentication target data, which is authenticated based on the authentication data registered in the server from the client, can be kept secret to the server. However, according to the technology disclosed in Non-Patent Literature 1, since the authentication data registered in the server is a plaintext, the authentication data, which is sensitive data of the client from the server, may be leaked. Furthermore, the technology disclosed in Non-Patent Literature 1 also has a problem that the authentication data is not kept secret to a server manager.

In addition, in order to solver such problems, it is considered to employ the technology disclosed in Patent Literature 2. However, according to the technology disclosed in Patent Literature 2, during encryption of the feature vector (the authentication data) for registration and the feature vector (the authentication target data) for authentication, it is necessary to use special homomorphism encryption called dual homomorphism encryption. In general, since the dual homomorphism encryption requires a calculation cost and the sizes of the secret key and the public key become too large, there is a problem that it is difficult to perform processing at a realistic time.

Therefore, based on simple processing, it is desired to keep the authentication target data and the authentication data secret to the server. The object of the present invention is to provide a collation system, a collation method, and a program, which contribute to such desire.

Solution to Problem

A collation system includes: a first node; a second node; and a third node. The first node includes: an encryption unit that encrypts authentication data by a public key and transmits the encrypted authentication data to the third node; a distance calculation unit that acquires the encrypted authentication data from the third node when authentication target data to be collated with the authentication data is received, and calculates a distance between the authentication target data and the authentication data by the public key in an encrypted state; and a collation data generation unit that generates a value, which is obtained by putting the distance into a polynomial acquired from the third node and encrypting the polynomial by the public key, as data for collation, and transmits the data for collation to the second node. The second node includes: a key generation unit that generates a pair of the public key and a secret key and transmits the public key to the first node; and a collation unit that collates the authentication target data with the authentication data based on the secret key and data for collation. The third node includes: a storage unit that holds the encrypted authentication data; and a collation information generation unit that generates, as the polynomial, a polynomial including a threshold value of the distance between the authentication data and the authentication target data as a parameter.

A node includes: an encryption unit that encrypts authentication data by a public key received from a second node that generates a pair of the public key and a secret key, and transmits the encrypted authentication data to the third node; a distance calculation unit that acquires the encrypted authentication data from the third node when authentication target data to be collated with the authentication data is received, and calculates a distance between the authentication target data and the authentication data by the public key in an encrypted state; and a collation data generation unit that generates a value, which is obtained by putting the distance into a polynomial acquired from the third node and encrypting the polynomial by the public key, as data for collation, and transmits the data for collation to the second node. The polynomial includes a threshold value of the distance between the authentication data and the authentication target data as a parameter.

In a collation method, a first node encrypts authentication data by a public key received from a second node that generates a pair of the public key and a secret key, and transmits the encrypted authentication data to a third node; the first node acquires the encrypted authentication data from the third node when authentication target data to be collated with the authentication data is received, and calculates a distance between the authentication target data and the authentication data by the public key in an encrypted state; and the first node generates a value, which is obtained by putting the distance into a polynomial acquired from the third node and encrypting the polynomial by the public key, as data for collation, and transmitting the data for collation to the second node. The polynomial includes a threshold value of the distance between the authentication data and the authentication target data as a parameter.

A program is provided for causing a computer in a first node to execute: a process of encrypting authentication data by a public key received from a second node that generates a pair of the public key and a secret key, and transmitting the encrypted authentication data to a third node; a process of acquiring the encrypted authentication data from the third node when authentication target data to be collated with the authentication data is received, and calculating a distance between the authentication target data and the authentication data by the public key in an encrypted state; and a process of generating a value, which is obtained by putting the distance into a polynomial acquired from the third node and encrypting the polynomial by the public key, as data for collation, and transmitting the data for collation to the second node. The polynomial includes a threshold value of the distance between the authentication data and the authentication target data as a parameter.

In addition, the program can be provided as a program product recorded on a non-transitory computer-readable storage medium.

Advantageous Effects of Invention

In accordance with a collation system, a node, a collation method, and a program according to the present invention, it is possible to keep authentication target data and authentication data secret to a server based on simple processing.

DESCRIPTION OF EMBODIMENTS

Firstly, the overview of an exemplary embodiment will be described. In addition, reference numerals supplemented to the overview are examples for only understanding, and are not intended to limit the present invention to the illustrated exemplary embodiment.

Figure 1:
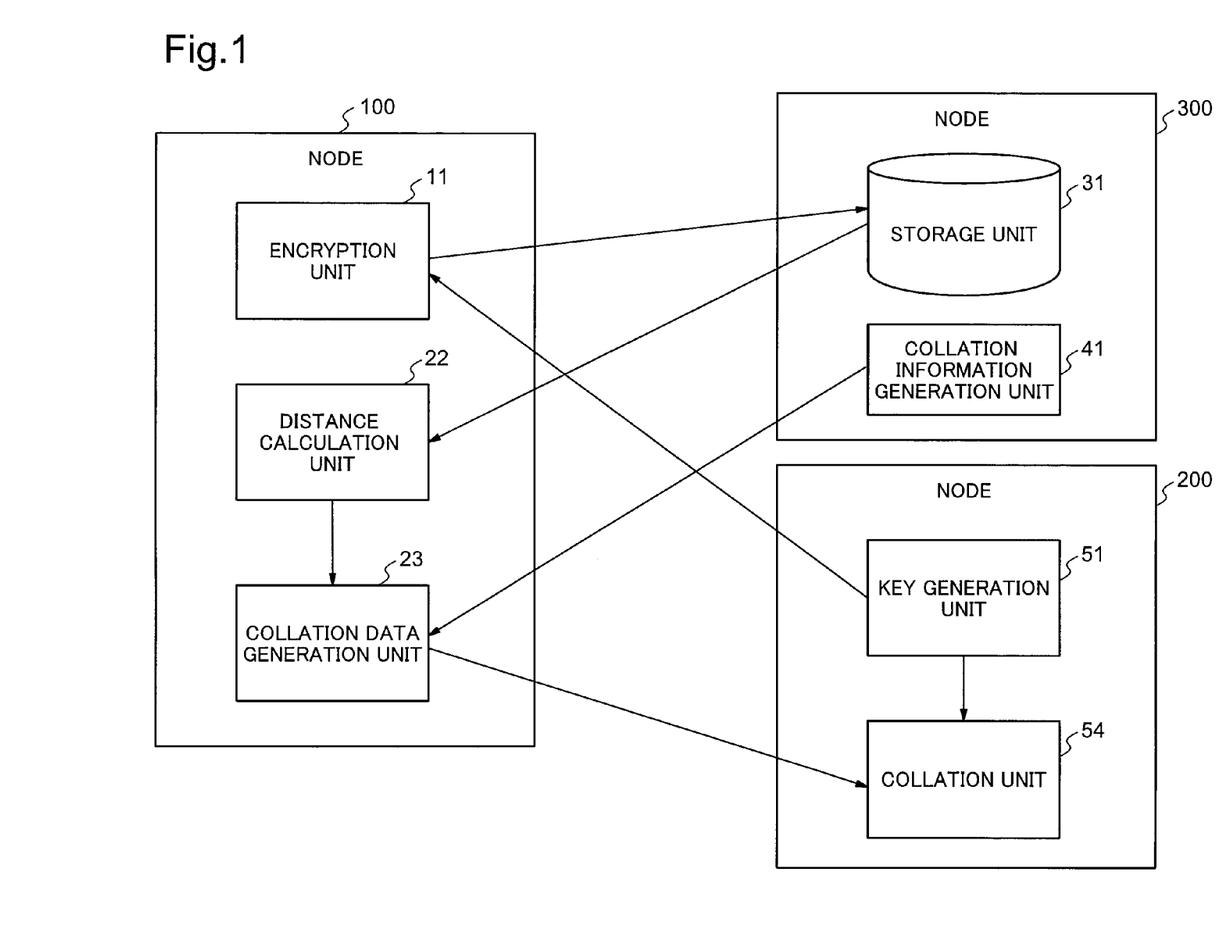
FIG. 1 is a block diagram illustrating a configuration of a collation system according to an exemplary embodiment as an example.

FIG. 1 is a block diagram illustrating a configuration of a collation system according to an exemplary embodiment as an example. Referring to FIG. 1, the collation system includes a first node 100 corresponding to a client, a second node 200 corresponding to an authentication node, and a third node 300 corresponding to a server. The first node 100 has an encryption unit 11, a distance calculation unit 22, and a collation data generation unit 23. On the other hand, the second node 200 has a key generation unit 51 and a collation unit 54. Furthermore, the third node 300 has a storage unit 31 and a collation information generation unit 41.

The key generation unit 51 of the second node 200 generates a pair of a public key and a secret key and transmits the public key to the first node 100. The encryption unit 11 of the first node 100 encrypts authentication data by the public key and transmits the encrypted authentication data to the third node 300. The storage unit 31 of the third node 300 holds the encrypted authentication data.

When authentication target data to be collated with authentication data is received, the distance calculation unit 22 of the first node 100 acquires the encrypted authentication data from the third node 300 and calculates a distance between the authentication target data and the authentication data by the public key in an encrypted state. The collation information generation unit 41 of the third node 300 generates a polynomial including a threshold value of the distance between the authentication data and the authentication target data as a parameter. The collation data generation unit 23 of the first node 100 generates a value, which is obtained by putting the calculated distance into the polynomial acquired from the third node 300 and encrypting the polynomial by the public key, as data for collation, and transmits the data for collation to the second node 200. The collation unit 54 of the second node 200 collates the authentication target data with the authentication data based on the secret key and the data for collation.

Herein, preferably, the encryption unit 11 performs encryption based on an encryption scheme having additive homomorphism. As an example, the encryption unit 11 may also perform the encryption based on Paillier encryption.

The collation information generation unit 41 may also, as the aforementioned polynomial, a polynomial having a value of 0 when a distance between an independent variable and the authentication data is within the aforementioned threshold value.

Furthermore, the encryption unit 11 may further encrypt a square of the authentication data by the public key and transmit the encrypted square of authentication data to the third node 300, and the storage unit 31 may further hold the encrypted square of authentication data. At this time, preferably, the distance calculation unit 22 acquires the encrypted authentication data and the encrypted square of authentication data from the third node 300, and calculates the distance between the authentication target data and the authentication data by the public key in an encrypted state.

Moreover, the authentication data and the authentication target data may also include an n-dimensional element. At this time, preferably, the distance calculation unit 22 calculates an n-dimensional Euclid distance between the authentication target data and the authentication data by the public key in an encrypted state.

Furthermore, the authentication data and the authentication target data may also include a plurality of elements. At this time, the distance calculation unit 22 calculates the aforementioned distance with respect to each element in an encrypted state. The collation information generation unit 41 generates a polynomial with respect to each element. The collation data generation unit 23 generates data for collation with respect to each element. Preferably, the collation unit 54 collates the authentication target data with the authentication data by using the secret key and the data for collation generated with respect to the plurality of elements.

According to the technology disclosed in Non-Patent Literature 1, since the data registered in the server is a plaintext as is, it is probable that the data is leaked from the server. Furthermore, there is also a problem that the secrecy of data to the server manager may not be kept.

In accordance with the collation system according to the aforementioned exemplary embodiment, as well as the authentication target data sent from the client (the first node) to the server (the third node) during authentication, authentication data stored in a database and the like of the server (the third node) is also encrypted using an encryption scheme with a high degree of secrecy. Consequently, according to the collation system, the aforementioned problem in the technology disclosed in Non-Patent Literature 1 is solved. Furthermore, since the special property of homomorphism is added to the encryption scheme, it is possible to calculate a Euclid distance of data in an encrypted state, so that it is guarantee to be able to collate encrypted data without decrypting the encrypted data. Moreover, a ciphertext of a square of authentication data is added as data generated during registration, so that it is possible to calculate a distance between encrypted data, which is not possible in Non-Patent Literature 1.

As described above, in accordance with the collation system according to the aforementioned exemplary embodiment, it is possible to prevent leakage of authentication data held in the third node (the server), and to prevent leakage of a plaintext of the authentication data even though a server manager is malicious. The reason for this is because the authentication data is encrypted by an encryption key not decrypted by the server manager, during data registration.

Exemplary Embodiment 1

Next, a collation system according to a first exemplary embodiment will be described with reference to the drawings.

Figure 2:
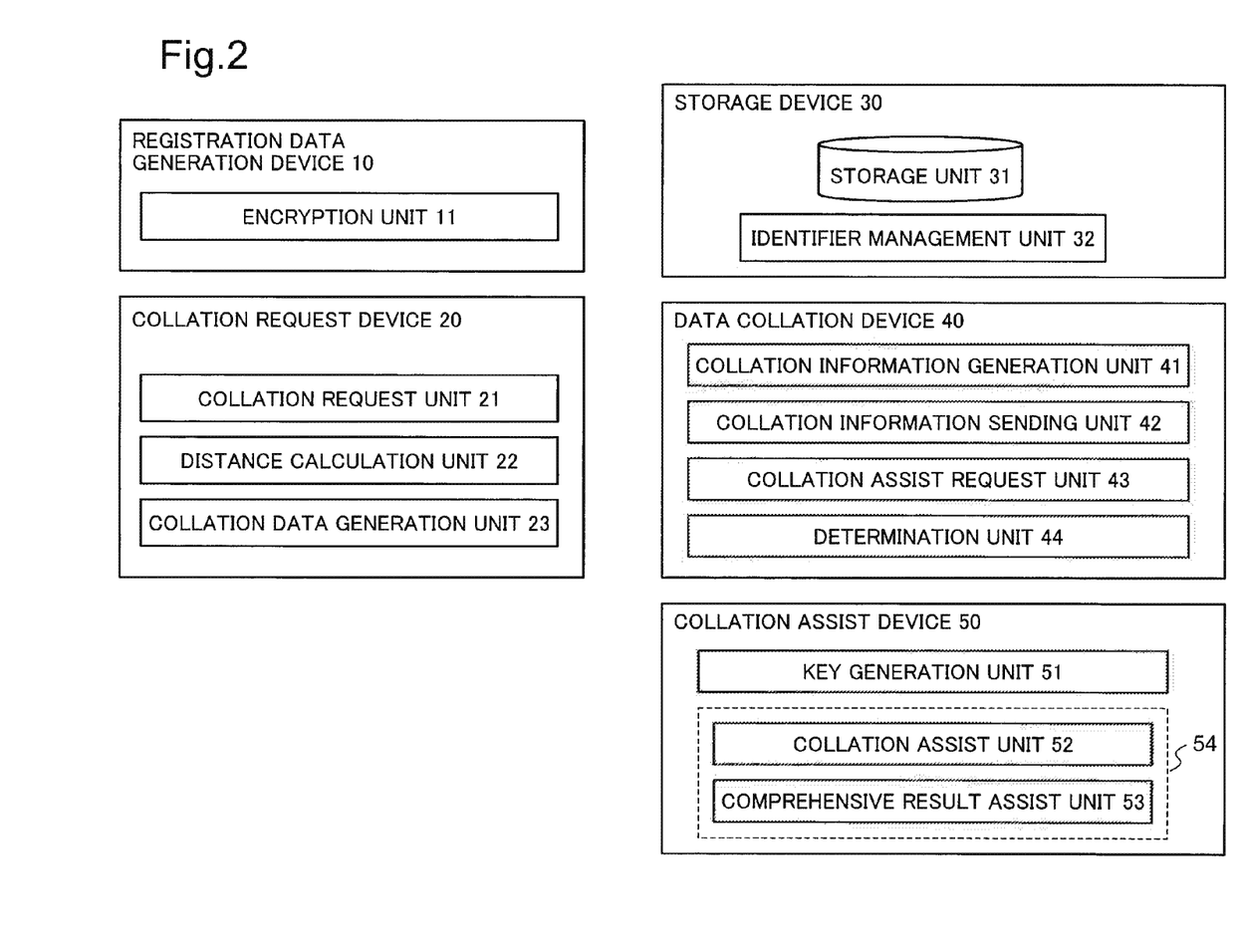
FIG. 2 is a block diagram illustrating a configuration of a collation system according to a first exemplary embodiment as an example.

FIG. 2 is a block diagram illustrating a configuration of a collation system according to the present exemplary embodiment as an example. Referring to FIG. 2, the collation system includes a registration data generation device 10, a collation request device 20, a storage device 30, a data collation device 40, and a collation assist device 50.

In addition, FIG. 2 illustrates the case in which the collation system is configured by five nodes; however, the collation system of the present invention is not limited to the illustrated exemplary embodiment. As an example, the registration data generation device 10 and the collation request device 20 may also be collectively employed as a first node (a client), the collation assist device 50 may also be employed as a second node (an authentication node), and the storage device 30 and the data collation device 40 may also be collectively employed as a third node (a server).

The registration data generation device 10 has an encryption unit 11. The encryption unit 11 employs authentication data to be concealed and an encryption key opened by the collation assist device 50 as input, performs a concealment process on the authentication data by using the encryption key, and outputs encrypted data.

Herein, the encryption key opened by the collation assist device 50 is a public key of additive homomorphism public key encryption.

The storage device 30 has a storage unit 31 and an identifier management unit 32. The storage unit 31 stores the encrypted data sent from the registration data generation device 10 and a unique identifier assigned by the identifier management unit 32.

The collation request device 20 has a collation request unit 21, a distance calculation unit 22, and a collation data generation unit 23. The collation request unit 21 sends a collation request to the data collation device 40 when authentication target data to be collated with authentication data is received as input. The distance calculation unit 22 employs the authentication target data to be collated and information for collation received from the data collation device 40 as input, and generates encrypted distance data. The collation data generation unit 23 employs the encrypted distance data as input and generates data for collation while communicating with the collation assist device 50.

The data collation device 40 has a collation information generation unit 41, a collation information sending unit 42, a collation assist request unit 43, and a determination unit 44. The collation information generation unit 41 employs the encrypted data stored in the storage device 30 as input, and generates information for collation. The collation information sending unit 42 receives the collation request sent from the collation request device 20 as input, and sends the information for collation. The collation assist request unit 43 receives the data for collation sent from the collation request device 20 as input, generates a collation assist request, and sends the collation assist request to the collation assist device 50. The determination unit 44 receives a comprehensive result received from the collation assist device 50 as input, and generates and outputs a collation result.

The collation assist device 50 has a key generation unit 51, a collation assist unit 52, and a comprehensive result assist unit 53. The key generation unit 51 generates a public key and a secret key of additive homomorphism encryption, opens the public key, and holds the secret key. The collation assist unit 52 communicates with the collation data generation unit 23 of the collation request device 20, and assists the generation of the data for collation. The comprehensive result assist unit 53 receives the collation assist request sent from the data collation device 40 and the secret key of the additive homomorphism encryption as input, and generates the comprehensive result.

Next, an operation of the collation system (FIG. 2) according to the present exemplary embodiment will be described in detail with reference to the drawings.

The operation of the collation system is classified into two phases of a data registration phase and a ciphertext collation phase. In the data registration phase, authentication data is input to the registration data generation device 10, is encrypted, and is registered in the storage device 30. On the other hand, in the ciphertext collation phase, the authentication target data input to the collation request device 20 is being kept secret and it is determined whether the authentication target data is approximate to (the Euclid distance is short) the plaintext of the encrypted data stored in the storage device 30. Hereinafter, an operation in each phase will be described in detail.

[Data Registration Phase]

Figure 3:
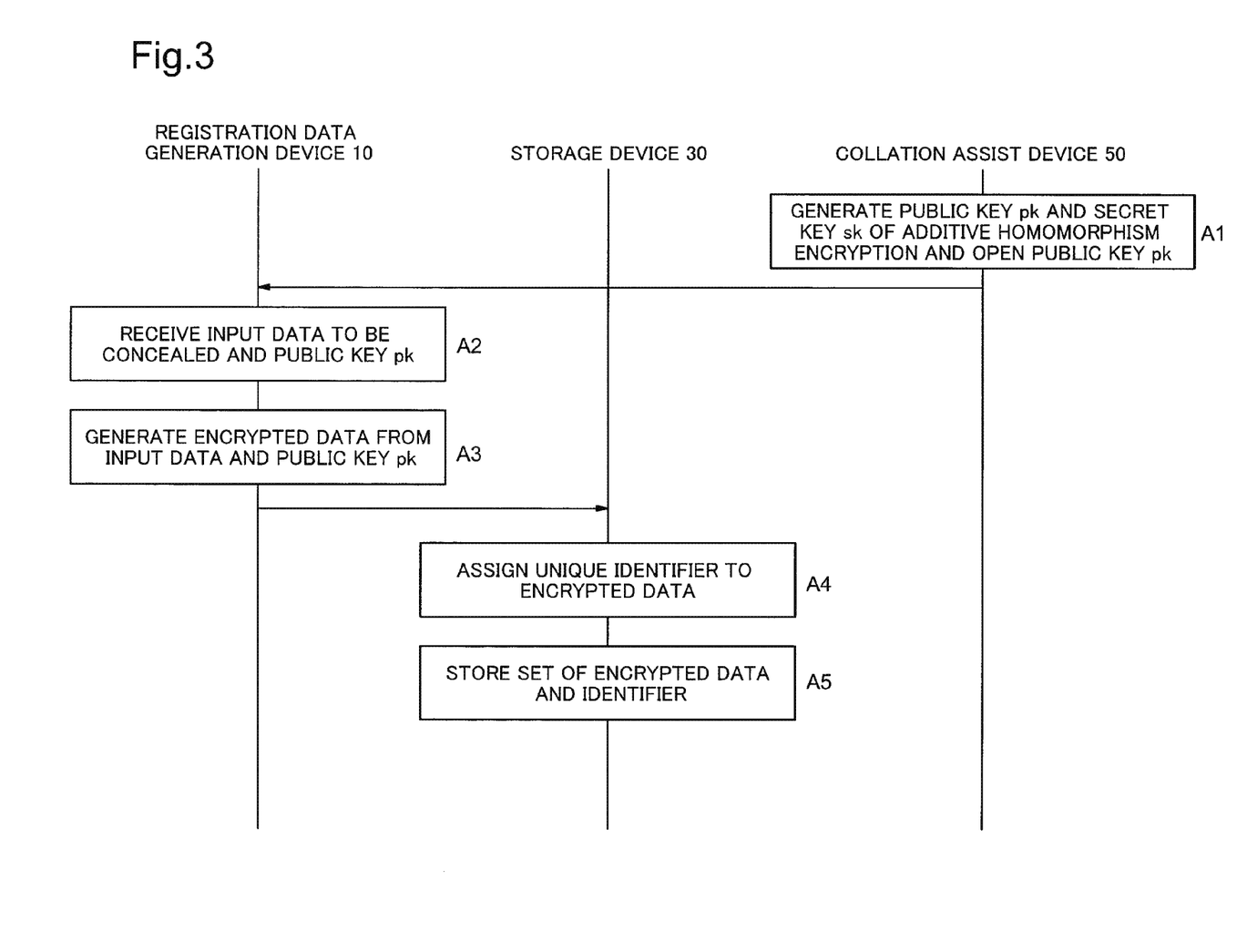
FIG. 3 is a sequence diagram illustrating a data registration operation of a collation system according to a first exemplary embodiment as an example.

FIG. 3 is a sequence diagram illustrating an operation in the data registration phase of the collation system as an example.

Referring to FIG. 3, the key generation unit 51 of the collation assist device 50 generates the public key and the secret key of additive homomorphism encryption and opens the public key (step A1).

Next, the registration data generation device 10 receives authentication data to be concealed and the public key (step A2).

Next, the encryption unit 11 of the registration data generation device 10 generates encrypted data from the input authentication data and public key, and sends the encrypted data to the storage device 30 (step A3).

When the encrypted data is received, the identifier management unit 32 of the storage device 30 assigns a unique identifier to the encrypted data (step A4). Furthermore, the identifier management unit 32 stores a set of the encrypted data and the identifier in the storage unit 31 (step A5).

[Ciphertext Collation Phase]

Figure 4:
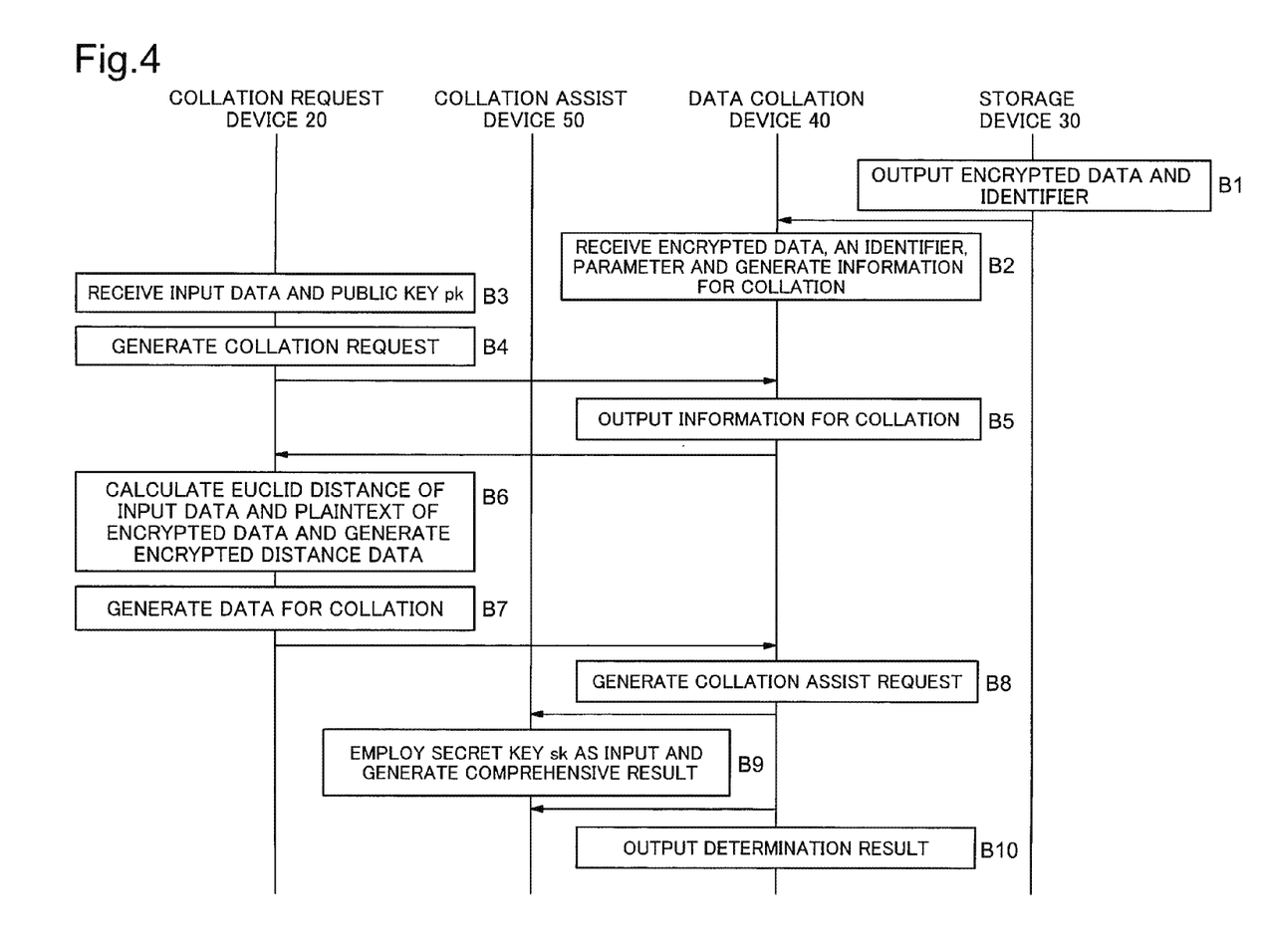
FIG. 4 is a sequence diagram illustrating a ciphertext collation operation of a collation system according to a first exemplary embodiment as an example.

FIG. 4 is a sequence diagram illustrating an operation in the ciphertext collation phase of the collation system as an example.

Referring to FIG. 4, the collation information generation unit 41 of the data collation device 40 receives the encrypted data stored in the storage unit 31, and an identifier and a parameter corresponding to the encrypted data (step B1), and generates information for collation (step B2).

Next, the collation request unit 21 of the collation request device 20 receives authentication target data and a public key (step B3).

Next, when the authentication target data and the public key are received, the collation request unit 21 of the collation request device 20 generates a collation request and outputs the collation request to the data collation device 40 (step B4).

When the collation request is received, the collation information sending unit 42 of the data collation device 40 outputs information for collation to the collation request device 20 (step B5).

When the information for collation is received, the distance calculation unit 22 of the collation request device 20 calculates a Euclid distance of the authentication target data and the plaintext of the encrypted data in an encrypted state, and generates encrypted distance data (step B6).

The collation data generation unit 23 employs the encrypted distance data and the information for collation as input, generates data for collation while communicating with the collation assist unit 52 of the collation assist device 50, and outputs the data for collation to the data collation device 40 (step B7).

When the data for collation is received, the collation assist request unit 43 of the data collation device 40 generates a collation assist request and outputs the collation assist request to the collation assist device 50 (step B8).

When the collation assist request is received, the comprehensive result assist unit 53 of the collation assist device 50 employs the secret key as input, generates a comprehensive result, and outputs the comprehensive result to the data collation device 40 (step B9).

When the comprehensive result is received, the determination unit 44 of the data collation device 40 performs determination and outputs a determination result (step B10).

In accordance with the collation system according to the present exemplary embodiment, as well as authentication target data sent from the registration data generation device 10 to the storage device 30 during authentication, authentication data stored in the storage device 30 is also encrypted using an encryption scheme with a high degree of secrecy. Consequently, for example, when a server is configured by the storage device 30 and the data collation device 40, it is possible to prevent authentication data from being leaked from the server in accordance with the collation system according to the present exemplary embodiment.

Exemplary Embodiment 2

Next, a collation system according to a second exemplary embodiment will be described with reference to the drawings.

In the present exemplary embodiment, in the collation system according to the first exemplary embodiment, a one-dimensional Euclid distance is used as a distance. That is, when $d(D,D')=(D-D')^{\{2\}}$ is equal to or less than a threshold value d, it is determined that matching has been made, and when $d(D,D')=(D-D')^{\{2\}}$ is larger than d, it is determined that matching has not been made. Furthermore, in the present exemplary embodiment, additive homomorphism encryption (for example, Paillier encryption and the like) is used. Hereinafter, an operation in each phase will be described in detail with reference to FIG. 3 and FIG. 4.

[Data Registration Phase]

Referring to FIG. 3, the key generation unit 51 of the collation assist device 50 generates a public key pk and a secret key sk of additive homomorphism encryption and opens the public key (step A1).

Next, the registration data generation device 10 receives authentication data D to be concealed and the public key pk generated by the key generation unit 51 (step A2).

Next, the encryption unit 11 of the registration data generation device 10 generates encrypted data (Enc(pk,D), Enc(pk,$D^2$)) from the input authentication data D and public key pk, and sends the encrypted data to the storage device 30 (step A3). Herein, Enc(pk,D) indicates a result obtained by encrypting the authentication data D by using the public key pk. Similarly, Enc(pk,$D^2$) indicates a result obtained by encrypting a square of the authentication data D by using the public key pk.

The identifier management unit 32 of the storage device 30 assigns a unique identifier ID to the encrypted data when the encrypted data is received (step A4). Furthermore, the identifier management unit 32 stores a set ((Enc(pk,D), Enc(pk,$D^2$)), ID) of the encrypted data and the identifier in the storage unit 31 (step A5).

[Ciphertext Collation Phase]

Referring to FIG. 4, the collation information generation unit 41 of the data collation device 40 receives the set ((Enc(pk,D), Enc(pk,$D^2$)), ID) of the encrypted data stored in the storage unit 31 and the identifier corresponding to the encrypted data (step B1), and generates information for collation in the following order (step B2).

1. The collation information generation unit 41 randomly generates a polynomial F(x) which is equal to 0 when x=0, 1, . . . , d and is not equal to 0 in other cases. For example, $F(x)=x(x-1)(x-2) \ldots (x-d)$ is a polynomial of the $(d+1)^{th}$ degree, which satisfies the aforementioned property. In general, a polynomial of the $(d+1)^{th}$ degree or more, which satisfies such conditions, can be easily configured. For the purpose of simplification, it is assumed that coefficients of F(x) are $\alpha[0]$ to $\alpha[N]$. That is, $F(x)=\alpha[N]x^N+\alpha[N-1]x^{\{N-1\}}+\ldots+\alpha[0]$. When $F(x)=x(x-1)(x-2)\ldots(x-d)$, N=d.

2. The collation information generation unit 41 employs ((Enc(pk,D),Enc(pk,$D^2$)), $\alpha[0]$ to $\alpha[N]$) as information for collation.

Next, the collation request unit 21 of the collation request device 20 receives authentication target data D' and the public key pk (step B3).

Next, when the authentication target data D' and the public key pk are received, the collation request unit 21 of the collation request device 20 generates a collation request req and outputs the collation request req to the data collation device 40 (step B4). The collation request req is a message requesting collation.

When the collation request is received, the collation information sending unit 42 of the data collation device 40 outputs the information for collation to the collation request device 20 (step B5).

When the information for collation is received, the distance calculation unit 22 of the collation request device 20 calculates a Euclid distance of the authentication target data D' and the plaintext of the encrypted data in an encrypted state, and generates encrypted distance data as follows (step B6).

1. The distance calculation unit 22 calculates Enc(pk,$D'^2$).

2. The distance calculation unit 22 calculates Enc(pk,d(D,D'))=Enc(pk,$D^2$)·Enc(pk,D)$^{\{-2D'\}}$·Enc(pk,$D'^2$).

The collation data generation unit 23 employs the encrypted distance data and the information for collation as input, and generates data for collation while communicating with the collation assist unit 52 of the collation assist device 50 and outputs the data for collation to the data collation device 40 as follows (step B7).

1. The collation data generation unit 23 randomly selects r, calculates $\text{Enc}(pk, r \cdot d(D,D')) = \text{Enc}(pk, d(D,D'))^{\{r\}}$, and sends it to the collation assist device 50.

2. The collation assist unit 52 of the collation assist device 50 decrypts $\text{Enc}(pk, r \cdot d(D,D'))$ by using the secret key sk, and calculates $r \cdot d(D,D')$.

3. The collation assist unit 52 calculates $(r \cdot d(D,D'))^{\{2\}}, \ldots, (r \cdot d(D,D'))^{\{N\}}$, respectively encrypts them by using the public key pk, calculates $\text{Enc}(pk, ((\cdot d(D,D'))^{\{2\}})), \ldots, \text{Enc}(pk, ((\cdot d(D,D'))^{\{N\}}))$, and outputs it to the collation request device 20.

4. The collation data generation unit 23 calculates $\text{Enc}(pk, ((\cdot d(D,D'))^{\{2\}}))^{\{1/r^2\}}, \ldots, \text{Enc}(pk, ((\cdot d(D,D'))^{\{N\}}))^{\{1/r^{\{N\}}\}}$ by using r selected in step 1, and obtains $\text{Enc}(pk, (((D,D'))^{\{2\}})), \ldots, \text{Enc}(pk, (((D,D'))^{\{N\}}))$.

5. The collation data generation unit 23 calculates $\text{Enc}(pk, F(d(D,D'))) = (\text{Enc}(pk, (((D,D'))^{\{N\}})))^{\{\alpha[N]\}} \cdot (\text{Enc}(pk, (((D,D'))^{\{N-1\}})))^{\{\alpha[N-1]\}} \ldots (\text{Enc}(pk, d(D,D')))^{\{\alpha[1]\}} \cdot \text{Enc}(pk, \alpha[0])$.

6. The collation data generation unit 23 randomly selects R, calculates $\text{Enc}(pk, F(d(D,D')))^{\{R\}}$, and outputs it to the data collation device 40.

Herein, step 6 is performed in order to allow output when $d(D,D') < d$ to be randomly performed. When it is not necessary to allow the output to be randomly performed, step 6 may also be omitted. Furthermore, step 1 is performed in order to keep the value of $d(D,D')$ secret to the collation assist device 50. When it is not necessary to keep the value of $d(D,D')$ secret, step 1 may also be omitted.

When the data for collation is received, the collation assist request unit 43 of the data collation device 40 generates a collation assist request and outputs the collation assist request to the collation assist device 50 as follows (step B8).

1. The collation assist request unit 43 randomly selects s, calculates $C = \text{Enc}(pk, F(d(D,D')))^{\{R\}} \cdot \text{Enc}(pk, s)$, and outputs it to the collation assist device 50.

Herein, step 1 is performed in order to prevent a collation result from being known to the collation assist device 50 by allowing a plaintext of C to be random. When the collation result is allowed to be known to the collation assist device 50, step 1 may also be omitted.

When the collation assist request is received, the comprehensive result assist unit 53 of the collation assist device 50 employs the secret key sk as input, generates a comprehensive result P as follows, and outputs the comprehensive result P to the data collation device 40 (step B9). That is, the comprehensive result assist unit 53 decrypts a ciphertext C by using the secret key sk, and outputs a decryption result to the data collation device 40 as the comprehensive result P.

When the comprehensive result P is received, the determination unit 44 of the data collation device 40 performs determination as follows and outputs a determination result (step B10). That is, when P=s, the determination unit 44 determines that $0 \leq d(D,D') \leq d$, and in other cases, the determination unit 44 determines that $d(D,D') > d$.

In the present exemplary embodiment, data registered in the storage device 30 is encrypted data. Furthermore, all data sent from the collation request device 20 in the collation phase is a ciphertext. Consequently, information regarding the registered authentication data D and the authentication target data D' is not absolutely leaked to the storage device 30 and the data collation device 40.

Moreover, the collation request device 20 and the data collation device 40 use random numbers, so that the information regarding the registered authentication data D and the authentication target data D' is not also absolutely leaked to the collation assist device 50.

Exemplary Embodiment 3

Next, a collation system according to a third exemplary embodiment will be described.

In the present exemplary embodiment, in the collation system according to the first exemplary embodiment, a two-dimensional Euclid distance is used as a distance. That is, when a distance $d(D,D') = (Dx-D'x)^{\{2\}} + (Dy-D'y)^{\{2\}}$ of two pieces of two-dimensional data $D = (Dx, Dy)$ and $D' = (D'x, D'y)$ is equal to or less than a threshold value d, it is determined that matching has been made, and when the distance is larger than d, it is determined that matching has not been made. Furthermore, in the present exemplary embodiment, additive homomorphism encryption (for example, Paillier encryption and the like) is used. Hereinafter, an operation in each phase will be described in detail.

[Data Registration Phase]

In step A3 of the data registration phase of the collation system according to the second exemplary embodiment using the one-dimensional Euclid distance as a distance, encrypted data $(\text{Enc}(pk,D), \text{Enc}(pk,D^2))$ is replaced with encrypted data $(\text{Enc}(pk,Dx), \text{Enc}(pk,Dx^2), \text{Enc}(pk,Dy), \text{Enc}(pk,Dy^2))$.

[Ciphertext Collation Phase]

In the ciphertext collation phase of the collation system according to the second exemplary embodiment using the one-dimensional Euclid distance as a distance, step B6 is changed as follows.

1. Calculate $\text{Enc}(pk, D'x^2), \text{Enc}(pk, D'y^2)$.

2. Calculate $\text{Enc}(pk, d(D,D')) = \text{Enc}(pk, Dx^2) \cdot \text{Enc}(pk, Dx)^{\{-2D'x\}} \cdot \text{Enc}(pk, D'x^2) \cdot \text{Enc}(pk, Dy^2) \cdot \text{Enc}(pk, Dy)^{\{-2D'y\}} \cdot \text{Enc}(pk, D'y^2)$.

In the present exemplary embodiment, similarly to the second exemplary embodiment, data registered in the storage device 30 is encrypted data. Furthermore, all data sent from the collation request device 20 in the collation phase is a ciphertext. Consequently, information regarding the registered authentication data D and the authentication target data D' is not absolutely leaked to the storage device 30 and the data collation device 40.

Moreover, the collation request device 20 and the data collation device 40 use random numbers, so that the information regarding the registered authentication data D and the authentication target data D' is not also absolutely leaked to the collation assist device 50.

Exemplary Embodiment 4

Next, a collation system according to a fourth exemplary embodiment will be described with reference to the drawings.

In the present exemplary embodiment, in the collation system according to the first exemplary embodiment, collation of data having two or more plural elements is performed. Herein, as an example, a description will be provided for the case in which each data has two elements, one element employs a one-dimensional Euclid distance as an index, and the other element employs a two-dimensional Euclid distance as an index, so that collation is performed. That is, when two pieces of data is $D=(t,(x,y)), D'=(e,(x',y'))$, if $d(t,t') \leq d\_\{t\}$ and $d((x,y),(x',y')) \leq d\_\{e\}$, it is determined that matching has been made, and in other cases, it is determined that matching has not been made. Furthermore, in the present exemplary embodiment, additive homomorphism encryption (for example, Paillier encryption and the like) is used. Hereinafter, an operation in each phase will be described in detail.

[Data Registration Phase]

Referring to FIG. 3, the key generation unit 51 of the collation assist device 50 generates a public key pk and a secret key sk of additive homomorphism encryption and opens the public key (step A1).

Next, the registration data generation device 10 receives authentication data D to be concealed and the public key pk generated by the key generation unit 51 (step A2).

Next, the encryption unit 11 of the registration data generation device 10 generates encrypted data (Enc(pk,t), Enc(pk,$t^2$)),(Enc(pk,x),Enc(pk,$x^2$)),(Enc(pk,y),Enc(pk,$y^2$)) from the input authentication data D and public key pk, and sends the encrypted data to the storage device 30 (step A3).

Herein, Enc(pk,a) indicates a result obtained by encrypting data a by using the public key pk. Similarly, Enc(pk,$a^2$) indicates a result obtained by encrypting a square of the data a by using the public key pk.

The identifier management unit 32 of the storage device 30 assigns a unique identifier ID to the encrypted data when the encrypted data is received (step A4). Furthermore, the identifier management unit 32 stores a set ((Enc(pk,t),Enc(pk,$t^2$)),(Enc(pk,x),Enc(pk,$x^2$)),(Enc(pk,y),Enc(pk,$y^2$)),ID) of the encrypted data and the identifier in the storage unit 31 (step A5).

[Ciphertext Collation Phase]

Referring to FIG. 4, the collation information generation unit 41 of the data collation device 40 employs the set ((Enc(pk,t),Enc(pk,$t^2$)),(Enc(pk,x),Enc(pk,$x^2$)),(Enc(pk,y),Enc(pk,$y^2$)),ID) of the encrypted data stored in the storage unit 31 and the identifier corresponding to the encrypted data as input (step B1), and generates information for collation in the following order (step B2).

1. The collation information generation unit 41 randomly generates a polynomial F(x) which is equal to 0 when x=0, 1, . . . , d_t and is not equal to 0 in other cases. For example, F(x)=x(x−1)(x−2) . . . (x−d_t) is a polynomial of the (d_t+1)$^{th}$ degree, which satisfies the aforementioned property. In general, a polynomial of the (d_t+1)$^{th}$ degree or more, which satisfies such conditions, can be easily configured. For the purpose of simplification, it is assumed that coefficients of F(x) are α[0] to α[N]. That is, F(x)=α[n]$x^n$+α[n−1]$x^{\{n-1\}}$+ . . . +α[0]. For example, when F(x)=x(x−1)(x−2) . . . (x−d_t), N=d_t.

2. Similarly to 1, the collation information generation unit 41 randomly generates a polynomial G(x) which is equal to 0 when x=0, 1, . . . , d_e and is not equal to 0 in other cases. For the purpose of simplification, it is assumed that coefficients of G(x) are β[0] to β[N']. That is, G(x)=β[N']$x^n$+β[N'−1]$x^{\{n-1\}}$+ . . . +αβ[0]. For example, when G(x)=x(x−1)(x−2) . . . (x−d_e), N'=d_e.

3. The collation information generation unit 41 employs ((Enc(pk,t),Enc(pk,$t^2$)),(Enc(pk,x),Enc(pk,$x^2$)),(Enc(pk,y),Enc(pk,$y^2$)),α[0] to α[N], β [0] to β [N']) as information for collation.

Next, the collation request unit 21 of the collation request device 20 receives input data D' and the public key pk (step B3).

Next, when the authentication target data D' and the public key pk are received, the collation request unit 21 of the collation request device 20 generates a collation request req and outputs the collation request req to the data collation device 40 (step B4). The collation request req is a message requesting collation.

When the collation request is received, the collation information sending unit 42 of the data collation device 40 outputs the information for collation to the collation request device 20 (step B5).

When the information for collation is received, the distance calculation unit 22 of the collation request device 20 calculates a Euclid distance of the authentication target data and the plaintext of the encrypted data in an encrypted state, and generates encrypted distance data as follows (step B6).

1. The distance calculation unit 22 calculates Enc(pk,$t'^2$), Enc(pk,$x'^2$),Enc(pk,$y'^2$).

2. The distance calculation unit 22 calculates Enc(pk,d(t,t'))=Enc(pk,$t^2$)·Enc(pk,t)$^{\{-2t'\}}$·Enc(pk,$t'^2$).

3. The distance calculation unit 22 calculates Enc(pk,d((x,y),(x',y')))=Enc(pk,$x^2$) Enc (pk,x)$^{\{-2z'\}}$·Enc (pk,$x'^2$)·Enc (pk,$y^2$)·Enc(pk,y)$^{\{-2y'\}}$·Enc (pk,$y'^2$).

The collation data generation unit 23 employs the encrypted distance data and the information for collation as input, and generates data for collation while communicating with the collation assist unit 52 of the collation assist device 50 and outputs the data for collation to the data collation device 40 as follows (step B7).

1. The collation data generation unit 23 randomly selects r_t, and calculates Enc(pk,r_t·d(t,t'))=Enc(pk,d(t,t'))$^{\{r\_t\}}$.

2. The collation data generation unit 23 randomly selects r_e, calculates Enc(pk,r_e·d((x,y),(x',y')))=Enc(pk,d((x,y),(x',y')))$^{\{r\_e\}}$, and sends it to the collation assist device 50 together with Enc(pk,r_t·d(t,t')) calculated in 1.

3. The collation assist unit 52 of the collation assist device 50 decrypts Enc(pk,r_t·d(t,t')) and Enc(pk,r_e·d((x,y),(x',y'))) by using the secret key sk, and calculates r_t·d(t,t'), r_e·d((x,y),(x',y')).

4. The collation assist unit 52 calculates (r_t·d(t,t'))$^{\{2\}}$, . . . , (r_t·d(t,t'))$^{\{N\}}$, (r_e·d((x,y),(x',y')))$^{\{2\}}$, . . . , (r_e·d((x,y),(x',y')))$^{\{N'\}}$, respectively encrypts them by using the public key pk, calculates Enc(pk,(r_t·d(t,t'))$^{\{2\}}$), . . . , Enc(pk,(r_t·d(t,t'))$^{\{N\}}$),Enc(pk,(r_e·d((x,y),(x',y')))$^{\{2\}}$), . . . , Enc(pk,(r_e·d((x,y),(x',y')))$^{\{N'\}}$), and outputs it to the collation request device 20.

5. The collation data generation unit 23 calculates)) Enc(pk,((·Enc(pk,(r_t·d(t,t'))$^{\{2\}}$)$^{\{1/r\_t^2\}}$, . . . , Enc(pk,(r_t·d(t,t'))$^{\{N\}}$)$^{\{1/(r\_t)^N\}}$, Enc(pk,(r_e·d((x,y),(x',y')))$^{\{2\}}$)$^{\{1/r\_t^2\}}$, . . . , Enc(pk,(r_e·d((x,y),(x',y')))$^{\{N'\}}$)$^{\{1/(r\_e)^{\{N\}}\}}$ by using r_t and r_e selected in steps 1 and 2, and obtains Enc(pk,((·Enc(pk,(r_t·d(t,t'))$^{\{2\}}$), . . . , Enc(pk,(r_t·d(t,t'))$^{\{N\}}$),Enc(pk,(r_e·d((x,y),(x',y')))$^{\{2\}}$), . . . , Enc(pk,(r_e·d((x,y),(x',y')))$^{\{N'\}}$).

6. The collation data generation unit 23 calculates Enc(pk,F(d(t,t')))=(Enc(pk,(((t,t'))$^{\{N\}}$))$^{\{\alpha[N]\}}$·(Enc(pk,(((t,t')$^{\{N-1\}}$))$^{\{\alpha[N-1]\}}$ . . . (Enc(pk,d(t,t'))$^{\{\alpha[1]\}}$·Enc(pk,α[0]), Enc(pk,G(d((x,y),(x',y'))))=(Enc(pk,((((x,y),(x',y')))$^{\{N'\}}$))$^{\{\beta[N']\}}$·(Enc(pk,((((x,y),(x',y'))$^{\{N'-1\}}$))$^{\{\beta[N'-1]\}}$ . . . (Enc(pk,d((x,y),(x',y'))))$^{\{\beta[1]\}}$·Enc(pk,β[0]).

7. The collation data generation unit 23 calculates Enc(pk,d(D,D'))=Enc(pk,F(d(t,t'))·Enc(pk,G(d((x,y),(x',y')))).

8. The collation data generation unit 23 randomly selects R, calculates Enc(pk,F(d(D,D')))$^{\{R\}}$, and outputs it to the data collation device 40.

Herein, step 8 is performed in order to allow output when d(D,D')<d to be randomly performed. When it is not necessary to allow the output to be randomly performed, step 8 may also be omitted. Furthermore, steps 1 and 2 are performed in order to keep the value of d(D,D') secret to the collation assist device 50. When it is not necessary to keep the value of d(D,D') secret, steps 1 and 2 may also be omitted.

When the data for collation is received, the collation assist request unit 43 of the data collation device 40 generates a collation assist request and outputs the collation assist request to the collation assist device 50 as follows (step B8).

1. The collation assist request unit 43 randomly selects s, calculates C=Enc(pk,F(d(D,D')))$^{\{R\}}$·Enc(pk,s), and outputs it to the collation assist device 50.

Herein, step 1 is performed in order to prevent a collation result from being known to the collation assist device 50 by allowing a plaintext of C to be random. When the collation result is allowed to be known to the collation assist device 50, step 1 may also be omitted.

When the collation assist request is received, the comprehensive result assist unit 53 of the collation assist device 50 employs the secret key sk as input, generates a comprehensive result P as follows, and outputs the comprehensive result P to the data collation device 40 (step B9). That is, the comprehensive result assist unit 53 decrypts a ciphertext C by using the secret key sk, and outputs a decryption result to the data collation device 40 as the comprehensive result P.

When the comprehensive result P is received, the determination unit 44 of the data collation device 40 performs determination as follows and outputs a determination result (step B10). That is, when P=s, the determination unit 44 determines that the authentication data D and the authentication target data D' have matched with each other, and in other cases, the determination unit 44 determines that the authentication data D and the authentication target data D' do not match with each other.

In the present exemplary embodiment, data registered in the storage device 30 is encrypted data. Furthermore, all data sent from the collation request device 20 in the collation phase is a ciphertext. Consequently, information regarding the registered authentication data D and the authentication target data D' is not absolutely leaked to the storage device 30 and the data collation device 40.

Moreover, the collation request device 20 and the data collation device 40 use random numbers, so that the information regarding the registered authentication data D and the authentication target data D' is not also absolutely leaked to the collation assist device 50.

In the present exemplary embodiment, the case, in which data includes two elements, and the elements respectively employ a one-dimensional Euclid distance and a two-dimensional Euclid distance as indexes, so that collation is performed, has been described. However, even when data includes three elements or more, the present invention can be easily applied. Furthermore, even when the Euclid distance employed as an index is a three-dimension or more, the present invention can be easily applied.

The collation system according to the aforementioned exemplary embodiment, as an example, can be applied to biometric authentication using a minutia including a type, a two-dimensional coordinate, and an angle as elements. In detail, input data in the data registration phase and input data in the ciphertext collation phase are used as biometric information (a minutia) acquired from a fingerprint, a vein and the like. In this way, while the biometric information is being kept secret, it is possible to determine whether encrypted biometric data stored in a storage device and encrypted biometric data created from a collation request device have been obtained from the same person. The determination is processed by whether Euclid distances of two pieces of input data are equal to or less than a constant number. Particularly, the biometric information has been known that the same data is not able to be always stably acquired. On the other hand, it can be assumed that data acquired from the same person is similar (it is possible to acquire data in which Euclid distances of each element are short). Consequently, the collation system according to the aforementioned exemplary embodiment can be preferably applied to biometric authentication.

In addition, the entire disclosure contents of the aforementioned Patent Literature and Non-Patent Literature are incorporated herein by reference. In a frame of the entire disclosure (including the appended claims) of the present invention, modification and adjustment of the exemplary embodiment are further possible based on the basic technical scope thereof. Furthermore, in the frame of the entire disclosure of the present invention, various combinations and selections of various disclosure elements (including each element of each claim, each element of each exemplary embodiment, each element of each drawing, and the like) are possible. That is, it is of course that the present invention includes various modifications and corrections which can be obtained by those skilled in the art according to the entire disclosure including the appended claims and the technical scope. Particularly, for a numerical value range disclosed herein, it should be noted that an arbitrary numerical value or a small range included in the range has been disclosed in detail even though there is no particular mention.

In addition, in the present invention, the following exemplary embodiments are possible.

Exemplary Embodiment 1

It is a collation system according to the aforementioned first aspect.

Exemplary Embodiment 2

The collation system according to the exemplary embodiment 1, the encryption unit performs encryption based on an encryption scheme having additive homomorphism.

Exemplary Embodiment 3

The collation system according to the exemplary embodiment 2, the encryption unit performs encryption based on Paillier encryption.

Exemplary Embodiment 4

The collation system according to any one of exemplary embodiments 1 to 3, the collation information generation unit generates, as the polynomial, a polynomial having a value of 0 when a distance between an independent variable and the authentication data is within the threshold value.

Exemplary Embodiment 5

The collation system according to any one of the exemplary embodiments 2 to 4, the encryption unit further encrypts a square of the authentication data by the public key and transmits the encrypted square of the authentication data to the third node, the storage unit further holds the encrypted square of the authentication data, and the distance calculation unit acquires the encrypted authentication data and the encrypted square of the authentication data from the third node, and calculates the distance between the authentication target data and the authentication data by the public key in an encrypted state.

Exemplary Embodiment 6

The collation system according to the exemplary embodiment 5, the authentication data and the authentication target data include an n-dimensional element, and the distance calculation unit calculates an n-dimensional Euclid distance between the authentication target data and the authentication data by the public key in an encrypted state.

Exemplary Embodiment 7

The collation system according to any one of the exemplary embodiments 1 to 6, the authentication data and the authentication target data include a plurality of elements, the distance calculation unit calculates the distance with respect to each element in an encrypted state, the collation information generation unit generates the polynomial with respect to each element, the collation data generation unit generates the data for collation with respect to each element, and the collation unit collates the authentication target data with the authentication data by using the secret key and the data for collation generated with respect to the plurality of elements.

Exemplary Embodiment 8

It is the collation system according to the aforementioned second aspect.

Exemplary Embodiment 9

The node according to the exemplary embodiment 8, the encryption unit performs encryption based on an encryption scheme having additive homomorphism.

Exemplary Embodiment 10

The node according to the exemplary embodiment 9, the encryption unit performs encryption based on Paillier encryption.

Exemplary Embodiment 11

The node according to any one of the exemplary embodiments 8 to 10, the polynomial is a polynomial having a value of 0 when a distance between an independent variable and the authentication data is within the threshold value.

Exemplary Embodiment 12

The node according to any one of the exemplary embodiments 9 to 11, wherein the encryption unit further encrypts a square of the authentication data by the public key and transmits the encrypted authentication data to the second node, and the distance calculation unit acquires the encrypted authentication data and the encrypted square of authentication data from the third node, and calculates the distance between the authentication target data and the authentication data by the public key in an encrypted state.

Exemplary Embodiment 13

The node according to the exemplary embodiment 12, the authentication data and the authentication target data include an n-dimensional element, and the distance calculation unit calculates an n-dimensional Euclid distance between the authentication target data and the authentication data by the public key in an encrypted state.

Exemplary Embodiment 14

The node according to any one of the exemplary embodiments 8 to 13, the authentication data and the authentication target data include a plurality of elements, the distance calculation unit calculates the distance with respect to each element in an encrypted state, and the collation data generation unit generates the data for collation with respect to each element by using the polynomial generated with respect to each element, and transmits the data for collation to the second node.

Exemplary Embodiment 15

A collation method in a collation system includes a first node, a second node, and a third node. The collation method includes:
a step in which the second node which generate a pair of a public key and a secret key and transmits the public key to the first node;
a step in which the first node which encrypt authentication data by the public key and transmits the encrypted authentication data to the third node;
a step in which the third node which hold the encrypted authentication data;
when authentication target data to be collated with the authentication data is received, the first node which acquire the encrypted authentication data from the third node, and calculate a distance between the authentication target data and the authentication data by the public key in an encrypted state;
a step in which the third node which generate a polynomial including a threshold value of the distance between the authentication target data and the authentication data as a parameter, and transmit the polynomial to the first node;
a step in which the first node which generate a value, which is obtained by putting the distance into the polynomial and encrypting the polynomial by the public key, as data for collation, and transmit the data for collation to the second node; and
a step in which the second node which collate the authentication target data with the authentication data based on the secret key and the data for collation.

Exemplary Embodiment 16

It is the collation method according to the aforementioned third aspect.

Exemplary Embodiment 17

The collation method according to the exemplary embodiment 16, the first node performs encryption based on an encryption scheme having additive homomorphism.

Exemplary Embodiment 18

The collation method according to the exemplary embodiment 17, the first node performs encryption based on Paillier encryption.

Exemplary Embodiment 19

The collation method according to any one of the exemplary embodiments 16 to 18, the polynomial is a polynomial having a value of 0 when a distance between an independent variable and the authentication data is within the threshold value.

Exemplary Embodiment 20

The collation method according to any one of the exemplary embodiments 17 to 19, further includes:
a step in which the first node which encrypt a square of the authentication data by the public key and transmit the encrypted square of authentication data to the third node,
wherein the first node acquires the encrypted authentication data and the encrypted square of authentication data from the third node, and calculates the distance between the authentication target data and the authentication data by the public key in an encrypted state.

Exemplary Embodiment 21

The collation method according to the exemplary embodiment 20, wherein the authentication data and the authentication target data include an n-dimensional element, and
the first node calculates an n-dimensional Euclid distance between the authentication target data and the authentication data by the public key in an encrypted state.

Exemplary Embodiment 22

The collation method according to any one of the exemplary embodiments 16 to 21, the authentication data and the authentication target data include a plurality of elements, the first node calculates the distance with respect to each element in an encrypted state, the collation information generation unit generates the polynomial with respect to each element, the collation data generation unit generates the data for collation with respect to each element, and the collation unit collates the authentication target data with the authentication data by using the secret key and the data for collation generated with respect to the plurality of elements, and transmits the data for collation to the second node.

Exemplary Embodiment 23

It is the program according to the aforementioned fourth aspect.

Exemplary Embodiment 24

The program according to the exemplary embodiment 23, wherein the program causes the computer to execute a process of performing encryption based on an encryption scheme having additive homomorphism.

Exemplary Embodiment 25

The program according to the exemplary embodiment 24, the first node performs encryption based on Paillier encryption.

Exemplary Embodiment 26

The program according to any one of the exemplary embodiments 23 to 25, the polynomial is a polynomial having a value of 0 when a distance between an independent variable and the authentication data is within the threshold value.

Exemplary Embodiment 27

The program according to any one of the exemplary embodiments 24 to 26, the program causes the computer to execute:
a process of encrypting a square of the authentication data by the public key and transmitting the encrypted square of the authentication data to the third; and
a process of acquiring the encrypted authentication data and the encrypted square of the authentication data from the third node, and calculating the distance between the authentication target data and the authentication data by the public key in an encrypted state.

Exemplary Embodiment 28

The program according to the exemplary embodiment 27, the program causes the computer to execute: the authentication data and the authentication target data include an n-dimensional element, and
a process of calculating an n-dimensional Euclid distance between the authentication target data and the authentication data by the public key in an encrypted state.

Exemplary Embodiment 29

The program according to any one of the exemplary embodiments 23 to 28, the program causes the computer to execute:
the authentication data and the authentication target data include a plurality of elements,
a process of calculating the distance with respect to each element in an encrypted state, and the collation data generation unit generates the data for collation with respect to each element by using the polynomial generated with respect to each element, and transmits the data for collation to the second node.

REFERENCE SIGNS LIST 10 registration data generation device
11 encryption unit
20 collation request device
21 collation request unit
22 distance calculation unit
23 collation data generation unit
30 storage device
31 storage unit
32 identifier management unit
40 data collation device
41 collation information generation unit
42 collation information sending unit
43 collation assist request unit
44 determination unit
50 collation assist device
51 key generation unit
52 collation assist unit
53 comprehensive result assist unit
54 collation unit
100,200,300 node

What is claimed is:
1. A collation system comprising:
a first node;
a second node; and
a third node, the first node including:
an encryption unit that encrypts authentication data by a public key and transmits the encrypted authentication data to the third node;
a distance calculation unit that acquires the encrypted authentication data from the third node when authentication target data to be collated with the authentication data is received, and calculates a distance between the authentication target data and the authentication data by the public key in an encrypted state to generate encrypted distance data; and
a collation data generation unit that generates a value, which is obtained by putting the distance into a polynomial acquired from the third node and encrypting the polynomial by the public key, as data for collation, and transmits the data for collation to the second node,
the second node including:
a key generation unit that generates a pair of the public key and a secret key and transmits the public key to the first node; and
a collation unit that collates the authentication target data with the authentication data based on the secret key and the data for collation, and
the third node including:
a storage unit that holds the encrypted authentication data; and
a collation information generation unit that generates, as the polynomial, a polynomial including a threshold value of the distance between the authentication data and the authentication target data as a parameter,
wherein the encryption unit performs encryption based on Paillier encryption.

2. The collation system according to claim 1, wherein the collation information generation unit generates, as the polynomial, a polynomial having a value of 0 when a distance between an independent variable and the authentication data is within the threshold value.

3. The collation system according to claim 1, wherein the encryption unit further encrypts a square of the authentication data by the public key and transmits the encrypted square of the authentication data to the third node,
the storage unit further holds the encrypted square of the authentication data, and
the distance calculation unit acquires the encrypted authentication data and the encrypted square of the authentication data from the third node, and calculates the distance between the authentication target data and the authentication data by the public key in an encrypted state.

4. The collation system according to claim 3, wherein the authentication data and the authentication target data include an n-dimensional element, and
the distance calculation unit calculates an n-dimensional Euclid distance between the authentication target data and the authentication data by the public key in an encrypted state.

5. The collation system according to claim 1, wherein the authentication data and the authentication target data include a plurality of elements,
the distance calculation unit calculates the distance with respect to each element in an encrypted state,
the collation information generation unit generates the polynomial with respect to each element,
the collation data generation unit generates the data for collation with respect to each element, and the collation unit collates the authentication target data with the authentication data by using the secret key and the data for collation generated with respect to the plurality of elements.

6. A node comprising:
an encryption unit that encrypts authentication data by a public key received from a second node that generates a pair of the public key and a secret key, and transmits the encrypted authentication data to a third node;
a distance calculation unit that acquires the encrypted authentication data from the third node when authentication target data to be collated with the authentication data is received, and calculates a distance between the authentication target data and the authentication data by the public key in an encrypted state to generate encrypted distance data; and
a collation data generation unit that generates a value, which is obtained by putting the distance into a polynomial acquired from the third node and encrypting the polynomial by the public key, as data for collation, and transmits the data for collation to the second node,
wherein the polynomial includes a threshold value of the distance between the authentication data and the authentication target data as a parameter,
wherein the encryption unit performs encryption based on Paillier encryption.

7. A collation method comprising:
encrypting, based on Paillier encryption, authentication data, in a first node, by a public key received from a second node that generates a pair of the public key and a secret key, and transmitting the encrypted authentication data to a third node;
acquiring the encrypted authentication data in the first node from the third node when authentication target data to be collated with the authentication data is received, and calculating a distance between the authentication target data and the authentication data by the public key in an encrypted state to generate encrypted distance data; and
generating a value, which is obtained, using the first node, by putting the distance into a polynomial acquired from the third node and encrypting the polynomial by the public key, as data for collation, and transmitting the data for collation to the second node,
wherein the polynomial includes a threshold value of the distance between the authentication data and the authentication target data as a parameter.

8. A non-transitory computer readable medium storing a program causing a computer in a first node to execute:
encrypting, based on Paillier encryption, authentication data by a public key received from a second node that generates a pair of the public key and a secret key, and transmitting the encrypted authentication data to a third node;
acquiring the encrypted authentication data from the third node when authentication target data to be collated with the authentication data is received, and calculating a distance between the authentication target data and the authentication data by the public key in an encrypted state to generate encrypted distance data; and
generating a value, which is obtained by putting the distance into a polynomial acquired from the third node and encrypting the polynomial by the public key, as data for collation, and transmitting the data for collation to the second node, wherein the polynomial includes a threshold value of the distance between the authentication data and the authentication target data as a parameter.

* * * * *

UNITED STATES PATENT AND TRADEMARK OFFICE
CERTIFICATE OF CORRECTION

PATENT NO. : 9,910,478 B2
APPLICATION NO. : 14/787848
DATED : March 6, 2018
INVENTOR(S) : Toshiyuki Isshiki Page 1 of 1

It is certified that error appears in the above-identified patent and that said Letters Patent is hereby corrected as shown below:

On the Title Page

Delete "(30) Foreign Application Priority Data May 17, 2013 (JP) .................................. 2013-105356"
Insert --(30) Foreign Application Priority Data May 15, 2013 (JP) ................................ 2013-102955--

Signed and Sealed this
Twenty-second Day of May, 2018

Andrei Iancu
*Director of the United States Patent and Trademark Office*